United States Patent [19]

Ichikawa

[11] Patent Number: 4,492,033
[45] Date of Patent: Jan. 8, 1985

[54] LINEAR SCALE TYPE DISPLACEMENT MEASURING INSTRUMENT

[75] Inventor: Souji Ichikawa, Kanagawa, Japan

[73] Assignee: Mitutoyo Mfg. Co., Ltd., Tokyo, Japan

[21] Appl. No.: 481,788

[22] Filed: Apr. 4, 1983

[30] Foreign Application Priority Data

Apr. 7, 1982 [JP] Japan .................. 57-57604

[51] Int. Cl.³ .......................... G01B 11/04
[52] U.S. Cl. .................. 33/125 C; 33/125 T; 250/237 G
[58] Field of Search .......... 33/125 A, 125 C, 125 T, 33/DIG. 3, DIG. 19; 250/237 G

[56] References Cited

U.S. PATENT DOCUMENTS

| | | | |
|---|---|---|---|
| 3,815,125 | 6/1974 | May et al. | 250/237 G |
| 4,031,595 | 6/1977 | Welker | 33/125 C |
| 4,060,903 | 12/1977 | Ernst | 33/125 C |
| 4,160,328 | 7/1979 | Ernst | 33/125 C |
| 4,170,829 | 10/1979 | Nelle | 33/125 C |
| 4,250,381 | 2/1981 | Yoshiike et al. | 33/125 C |

FOREIGN PATENT DOCUMENTS 2908045  9/1980  Fed. Rep. of Germany .... 33/125 C

Primary Examiner—Richard R. Stearns
Attorney, Agent, or Firm—Koda and Androlia

[57] ABSTRACT

In a linear scale type displacement measuring instrument capable of measuring a relative displacement between two workpieces to be measured from a relative movement between a main scale and an index scale, there are provided elastic member non-joining portions each having a pitch and a length to be determined by the material qualities of the main scale, an elongate case and elastic members to connect the main scale to the elongate case, and the length of the main scale, whereby a thermal stress acting on the main scale through the elastic members at the time of temperature change is reduced.

6 Claims, 6 Drawing Figures

LINEAR SCALE TYPE DISPLACEMENT MEASURING INSTRUMENT

BACKGROUND OF THE INVENTION

1. Field of the invention

This invention relates to linear scale type displacement measuring instruments, and more particularly to improvements in a linear scale type displacement measuring instrument including a hollow elongate case connected to one of two workpieces, between which a relative displacement is to be measured; a main scale received in and held by the elongate case and made of a material having a coefficient of thermal expansion different from that of the elongate case; elastic members arranged in the longitudinal direction of the main scale for connecting the main scale to the elongate case so as to hold the main scale in the elongate case; and an index scale connected to the other of the two workpieces to be measured and movable along the main scale; wherein the relative displacement between the two workpieces to be measured is measured from a relative movement between the main scale and the index scale, and suitable for use in a linear scale type displacement measuring instrument having a long main scale.

2. Description of the prior art

A linear scale type displacement measuring instrument is one type of length measuring apparatuses for measuring or adjusting the positional relationship between two objects.

This linear scale type displacement measuring instrument is of such an arrangement as shown in FIGS. 1 through 3, for example.

In the drawings, an elongate case 1 made of aluminium and produced by cold drawing for example has a hollow section of substantially square shape, is elongated in a direction perpendicular to the paper surface of FIG. 1, and has an opening 2 along one side surface in the longitudinal direction, over the substantially total length.

A detecting mechanism 3 as the movable member is brought into abutting contact with an end face of the elongate case 1 on the side of the opening 2 through a slide member 4, and is movable in the longitudinal direction of the elongate case 1.

An arm 5 extending from the opening 2 into the elongate case 1 is integrally formed on the undersurface of this detecting mechanism 3. A pair of magnets 6 are provided at positions close to the opening 2 on the outer side surface of the elongate case 1. A seal member 7 formed of a thin iron sheet is attracted by these magnets 6 in a manner to cover the opening 2, whereby dust and the like are precluded from entering the elongate case 1 through the opening 2.

At this time, the seal member 7 disposed at a portion, into which the arm 5 of the detecting mechanism 3 is inserted, is extended through a groove 8 having a convex cross section as viewed from sideways, opposite ends of which are opened in the undersurface of the detecting mechanism 3. The arm 5 strided over by this groove 8 is insertable into the elongate case 1.

Inserted into a groove 9 formed in the elongate case 1 in the longitudinal direction thereof is the lower end portion of a main scale 10 made of glass and formed at one side surface 10B (a graduated surface) thereof with a vertical fringe-shaped graduation 10A (Refer to FIG. 2). The main scale 10 is solidly secured to the elongate case 1 by means of a spacer 11A, an elastic rubber member 11B and a bonding agent 11C disposed in the longitudinal direction thereof.

The arm 5 of the detecting mechanism 3 is extended to a position close to the main scale 10, and a carriage 13 is movably secured to the forward end portion of the arm 5 through a connecting means 12. For example, this connecting means 12 includes a linear cantilever spring 12D integrally formed at the distal end thereof with a triangular loop portion 12A and secured at the proximal end thereof to the arm 5 through a washer 12B and a screw 12C; and a truncated cone 12E engageable with the aforesaid loop portion 12A.

The cantilever spring 12D is adapted to urge the carriage 13 towards the graduated surface 10B additionally functioning as a frist scanning reference surface of the main scale 10, as well as to urge the carriage 13 towards an end face 10C as a second scanning reference surface perpendicularly intersecting the graduated surface 10B of the main scale 10.

The carriage 13 includes a probe mounting member 13A formed into a substantially L shape from a plate; a light emitting element mounting member 13B having a large thickness, being screwed to a bent short side at one end of the probe mounting member 13A and opposed to a surface of the main scale 10, where the graduation 10A is not formed; and a light receiving element mounting member 13C having a large thickness, being screwed (not shown) to a bent long side at the other end of the probe mounting member 13A and opposed to the graduated surface 10B of the main scale 10.

An index scale 14 having a vertical fringe-shaped graduation, not shown, similar to that of the main scale 10 is solidly secured to the surface of the probe mounting member 13A of the carriage 13 in opposed relationship to the graduated surface 10B of the main scale 10.

Light emitting elements 15 as the light source and light receiving elements 16 are arranged such that the index scale 14 and the main scale 10 are interposed therebetween.

In this case, two light emitting elements 15 are solidly secured to the light emitting element mounting member 13B affixed to the L-shaped short side of the probe mounting member 13A, and also two light receiving elements 16 are solidly secured to the light receiving element mounting member 13C affixed to the L-shaped long side of the probe mounting member 13A.

Pluralities of sliders 17 and 18 made of a resin material having a low frictional coefficient are solidly secured to inner surfaces of the L-shape of the probe mounting member 13A, i.e., the surfaces opposed to the graduated surface 10B as the first scanning reference surface of the main scale 10 and the end face 10C as the second scanning reference surface perpendicularly intersecting the graduated surface 10B, respectively. These sliders 17 and 18 are adapted to abut against the graduated surface 10B of the main scale 10 and the end face 10C perpendicularly intersecting the graduated surface 10B through a biasing force of the cantilever spring 12D.

In the above-described arrangement, when one of either the elongate case 1 or the detecting mechanism 3 as the movable member, e.g., the detecting mechanism 3, is secured to a workpiece to be measured and the other, i.e., the elongate case 1, is solidly secured to a bed of a machine, i.e., a stationary side 19, and, if the workpiece to be measured is moved, then bright and dark fringe patterns are generated between the graduated surface 10A of the main scale 10 and the graduation of the index scale 14. Changes in brightness and darkness of these fringe patterns are read by the light emitting elements 15 and the light receiving eleements 16, whereby a movement value of the workpiece being measured is read, so that measurement can be carried out.

The linear scale type displacement measuring instrument as described above has as its feature that a displacement of the workpiece being measured can be digitally measured. In general, however, the elongate case 1 is made of aluminium and the main scale 10 received and held in this elongate case 1 is made of glass, thereby presenting such a disadvantage that a difference in value of thermal expansion occurs therebetween at the time of temperature change. In consequence, as shown in FIG. 1, heretofore, the main scale 10 positioned by one side surface of the groove 9 of the elongate case 1 and the spacer 11A provided at the bottom of the groove 9 has been pressed and held over the total longitudinal length of the main scale 10 through the agency of the elastic rubber member 11B solidly secured to one side surface of the aforesaid groove 9 by the bonding agent 11C. The above-described holding method can stably hold the main scale 10 as compared with the case of using a spring or the like, and moreover, the difference in value of thermal expansion between the main scale 10 and the elongate case 1 is adapted to be absorbed by the elastic deformation of the elastic rubber members 11B. However, recently, linear scale type displacement measuring instruments have been utilized in feedback control systems of the large-sized numerical control machines. The linear scale type displacement measuring instruments for the application described above are sometimes as long as four to six meters in total length. According to the conventional holding method as described above, the difference in value of thermal expansion between the main scale and the elongate case cannot be absorbed, whereby a thermal stress acting on the main scale 10 through the elastic rubber members 11B becomes excessively large at the time of temperature change, thus possibly causing damage to the main scale 10. The same is true of the case where the main scale 10 is bonded to and held by one side surface of the groove 9 of the elongate case 1 by an elastic bonding agent, e.g., a silicone rubber bonding agent applied to the main scale 10 over the total longitudinal length.

SUMMARY OF THE INVENTION

The present invention has been developed to obviate the above-described disadvantages of the prior art and has as its first object the provision of a linear scale type displacement measuring instrument capable of stably holding a main scale, and moreover, avoiding damage of the main scale due to thermal stress at the time of temperature change.

A second object of the present invention is to provide a linear scale type displacement measuring instrument capable of being reliably protected from damage to the main scale.

A third object of the present invention is to provide a linear scale type displacement measuring instrument capable of being reliably protected from damage to the main scale, and moreover, satisfactorily maintaining the measuring accuracy during measurement at the time of temperature change.

To achieve the aforesaid first object, according to the invention, in a linear scale type displacement measuring instrument including a hollow elongate case connected to one of two workpieces, between which a relative displacement is to be measured; a main scale received in and held by the elongate case and made of a material having a coefficient of thermal expansion different from that of the elongate case; elastic members arranged in the longitudinal direction of the main scale for connecting the main scale to the elongate case so as to hold the main scale in the elongate case; and an index scale connected to the other of the two workpieces to be measured and movable along the main scale; and capable of measuring the relative displacement between the two workpieces from a relative movement between the main scale and the index scale, there are provided in the longitudinal direction of the main scale, elastic member non-joining portions each having a pitch and a length to be determined by the material qualities of the main scale, the elongate case and the elastic members, and the length of the main scale, whereby thermal stress acting on the main scale through the elastic members at the time of termperature change is reduced.

To achieve the aforesaid second object, according to the invention, the ratio in length between the elastic member joining portions of the main scale and the non-joining portions is set at about 1:3 or thereabove.

To achieve the aforesaid third object, according to the invention, the ratio in length between the elastic member joining portions of the main scale and the non-joining portions is set at about 1:15-1:20.

To achieve the aforesaid third object, according to the invention, when the total length of the main scale is about 2200 mm, the elastic member non-joining portions each having a length of about 200 mm are provided at intervals of about 215 mm on the main scale.

To achieve the aforesaid third object, according to the invention, when the total length of the main scale is about 4700 mm, the elastic member non-joining portions each having a length of about 200 mm are provided at intervals of about 210 mm on the main scale.

To achieve the aforesaid third object, according to the invention, when the main scale is made of glass, the elongate case is made of an alloy of aluminium, the elastic members are made of nitrile rubber and when the length of the main scale is 5 meter or less, the ratio in length between the elastic member joining portions of the main scale and the non-joining portions is set at 1:15-1:20.

According to the invention, the thermal stress acting on the main scale through the elastic members at the time of temperature change can be reduced and even a long main scale can be stably held without causing damage to the main scale.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Description will hereunder be given of the principles of the present invention.

Figure 5:
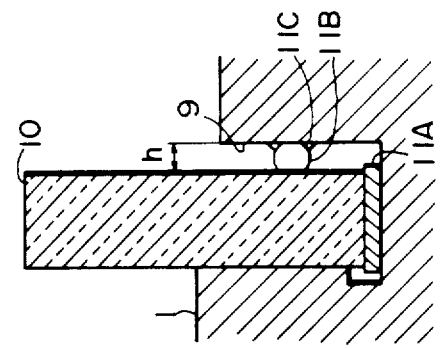
FIG. 5 is a cross sectional view thereof.
Figure 4:
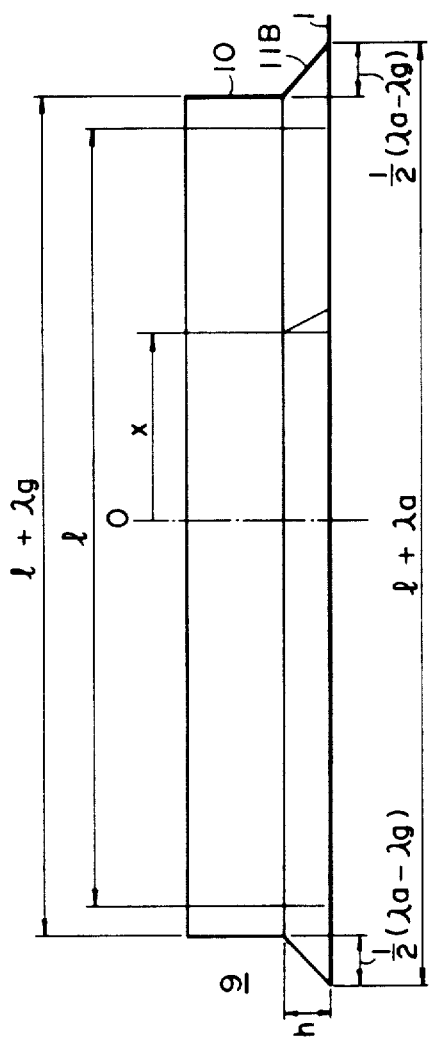
FIG. 4 is a plan view showing the state, where the main scale and the elongate case are pressed and held, in explanation of the principles of the present invention.

As shown in FIGS. 4 and 5, when the main scale 10 made of glass is pressed against and held in the groove 9 of the elongate case 1 over the longitudinal total length of the main scale 10 through the agency of the elastic rubber members 11B solidly secured to one side surface of the groove 9, a distortion $\epsilon a$ per unit length of the elongate case 1 due to temperature change at a desired point x measured from a middle point o will be shown by the following equation.

$$\epsilon a = \epsilon a1 - \epsilon a2 \quad (1)$$

where $\epsilon a1$ is a free distortion per unit length due to temperature change at the point x and $\epsilon a2$ is a distortion per unit length due to a reaction from the elastic rubber members 11B at the point x.

Likewise, a distortion $\epsilon g$ due to temperature change at the point x will be shown by the following equation.

$$\epsilon g = \epsilon g1 + \epsilon g2 \quad (2)$$

where $\epsilon g1$ is a free distortion per unit length due to temperature change at the point x and $\epsilon g2$ is a distortion per unit length due to a reaction from the elastic rubber members 11B at the point x.

Since a coefficient of thermal expansion $\alpha$ of the elongate case 1 made of aluminium is larger in value than a coefficient of thermal expansion $\beta$ of the main scale 10 made of glass, a difference in distortion per unit length ($\epsilon a - \epsilon g$) occurs relatively at opposite ends of the elastic rubber members 11B in the direction of height h. As a result, a force Fg per unit length due to heat applied to the main scale 10 through the elastic rubber members 11B at the point x at the time of temperature change will be shown by the following equation.

$$Fg = \frac{GS}{h}(\epsilon a - \epsilon g) \quad (3)$$

where G is a modulus of traverse elasticity of the elastic rubber members 11B, S a joining area and h a height.

In consequence, a maximum value Fgmax of the force due to heat applied to the main scale 10 at the time of temperature change will be shown by the following equation.

$$Fgmax = 2\frac{GS}{h}\int_{x=0}^{\frac{l}{2}}(\epsilon a - \epsilon g)dx \quad (4)$$

where l is the total length of the main scale 10.

After all, it is found that, in order to reduce the maximum value Fgmax of thermal stress, the modulus of traverse elasticity G or the joining area S should be decreased.

Assumption is made that a coefficient $\alpha$ of thermal expansion of the elongate case 1 is $2.2 \times 10^{-5}$ mm/mm°C., sectional area A of the main scale 10 is 110 mm$^2$, a coefficient of thermal expansion $\beta$ of the scale 10 is $0.9 \times 10^{-5}$ mm/mm°C., a Young's modulus of elasticity Eg of the scale 10 is $9 \times 10^3$ kg/mm$^2$, a Young's modulus of elasticity Er of the elastic rubber members 11B is 0.572 Kg/mm$^2$, a modulus of transverse elasticity G of the members 11B is 0.215 kg/mm$^2$, a coefficient of friction $\mu$ between the main scale 10 and the elongate case 1 is 0.3, for the sake of simplification in calculation, the elastic rubber members 11B having a height D of 2.5 mm and a width of 2 mm in free sections are compressed only in height to a height h of 2 mm, and inserted into a space formed between the elongate case 1 and the main scale 10, and the elongate case 1 has a sufficient modulus of section and free from being deformed by the elastic rubber members. Then, if there occurs a temperature change $\Delta T$ of 50° C., then the maximum value $\sigma gmax$ of a tensile stress acting on the main scale 10 due to a thermal stress and the maximum value $\sigma rmax$ of a tensile stress acting on the elastic rubber members 11B due to a thermal stress will be indicated in Table 1 shown below.

TABLE 1

| | Tolerance limits | l = 2200 | l = 4700 |
|---|---|---|---|
| $\sigma gmax$ | 3 kg/mm$^2$ | 1.35 kg/mm$^2$ | 3.67 kg/mm$^2$ |
| $\sigma rmax$ | 0.8 | 0.175 | 0.235 |

As apparent from Table 1, when the total length l of the main scale 10 is about 2200 mm (the effective length is about 200 mm), the tensile stresses of the main scale 10 and the elastic rubber members 11B do not exceed the tolerance limits. On the other hand, when the total length l of the main scale 10 is 4700 mm (the effective length is 4500 mm), the main scale 10 will be broken by the thermal stress.

Here, the maximum value $\sigma gmax$ of the tensile stress acting on the main scale 10 may be approximated as shown in the following equations.

$$\sigma g = \frac{wl^2 + 4\mu l}{8A} \quad (5)$$

$$w = \frac{l(\alpha - \beta)\Delta T - \mu l^2/4AEg}{\frac{l^3}{12AEg} + \frac{hl}{GS}} \quad (6)$$

$$l = \left(1 - \frac{h}{D}\right)SEr \quad (7)$$

As a result, if the modulus of transverse elasticity G' of the elastic rubber members 11BA is approximated to 0.07 kg/mm$^2$ (Er' ≈ 0.19 kg/mm$^2$), then the maximum value of the tensile stress $\sigma gmax$ acting on the main scale 10 may be reduced to 1.48 Kg/mm$^2$ approximately, thus enabling to correspond to the case where the total length l of the main scale 10 is 2200 mm. In this case, the ratios between the moduli of transverse elasticity G' and G and between the Young's moduli of elasticity Er' and Er will be indicated in the following equations.

$$\frac{G'}{G} = \frac{0.07}{0.215} \approx \frac{1}{3} \quad (8)$$

$$\frac{Er'}{Er} = \frac{0.19}{0.572} \approx \frac{1}{3} \quad (9)$$

As a result, even when the total length 1 of the main scale 10 is 4700 mm, if the modulus of transverse elasticity G of the elastic rubber members 11B is set at a value one thirds or one fourths of that in the case where the total length 1 of the main scale 10 is 2200 mm, then such an effect which is comparable with the conventional case where the total length 1 of the main scale 10 is 2200 mm, thus avoiding the danger of damage caused to the main scale 10.

As the methods of reducing the modulus of transverse elasticity G of the elastic rubber members 11B may include the followings.

(1) The material of the elastic rubber members 11B is changed so as to reduce the modulus of transverse elasticity G.

(2) The contour of the elastic rubber members 11B is changed. However, according to the method shown in Item (1), the modulus of transverse elasticity G is decreased as the main scale 10 becomes longer, whereby there occurs the possibility of not being able to obtain an elastic member satisfying other characteristics (particularly, stability) and a possibility of not providing the function of fixation, which has been originally required. On the other hand, according to the method shown in Item (2), difficulties are encountered in finishing the elastic member, and also, the disadvantage of not providing the function of fixation is presented.

Therefore, according to the invention, the joining area S is reduced as the main scale 10 becomes longer, whereby the same effect is obtained as in the case where the modulus of traverse elasticity G of the elastic rubber members 11B is decreased. In this case, in order to prevent the main scale 10 from being damaged, in the case of the main scale having a total length of 4700 mm for example, the joining area S should be one third or one forth of that in the case of the main scale having a total length of 2200 mm, as in the above-described calculation.

According to the above-described method, the damage which would otherwise be caused to the main scale 10 due to temperature change can be avoided. On the other hand, in consideration of the case where the above-described temperature change occurs during measurement, the elongation value λg of the main scale 10 over the total length, when a value decreased due to a tensile force of the elastic rubber members 11B is disregarded, will be shown by the following equation.

$$\lambda g = \frac{w l^2}{12.4 Eg} + \frac{\mu l^2}{4AE} \quad (10)$$

The second term in the right member of this equation (10) indicates an increased or decreased value given to the main scale 10 from the elastic rubber member 11B due to frictional engagement, and the value changes its sign depending on the elevation or lowering of temperature. For example, when the ambient temperature changes from 10°→20°→60° C., a hysteresis corresponding to the second term in the right member of the aforesaid equation (10) causes.

If the value of this hysteresis is extracted in the case of the main scale 10 of the total length of 2200 mm, the value is 0.084 mm. Additionally, when the value decreases due to the tensile force of the elastic rubber members 11B is considered, the value becomes 0.077 mm. Because this study is made on the safety side, the case where the value decreased due to the tensile force of the elastic rubber members 11B will be continuously disregarded. This hysteresis is a fairly high value, which cannot be disregarded in measuring at about 1 μm accuracy. As a result, even in the case of the linear scale type displacement measuring instrument having the main scale 10 of the total length of 2200 mm, it is desirable that non-joining portions each being of about 200 mm in length are provided at the intervals of 215 mm on the main scale 10 for example. In this case, since the modulus of traverse elasticity G of the elastic rubber members 11B equivalently becomes 15/215=0.07, the value of hysteresis becomes 5.8 μm over the total length of the main scale 10, so that improvements to a considerable extent can be expected.

Further, in the case of the main scale 10 having the total length 1 of 4700 mm, the value of hysteresis becomes 0.383 mm. Therefore, non-joining portions each being of about 200 mm are provided at intervals of 210 mm on the main scale 10 for example, so that the hysteresis can be improved to a great extent.

On the other hand, a study was made on the reliability against the external force when the elastic member non-joining portions were provided on the main scale 10 and it was ascertained that the safety was secured until the external force exceeds about 10 g provided that the aforesaid numerical values were utilized.

After all, the ratio in length between the main scale elastic member joining portions and the non-joining portions for preventing the main scale from being damaged is set at about 1:3 or thereabove, and further, the ratio in length between the elastic member joining portions and the non-joining portions for preventing the main scale from being damaged, and moreover, maintaining the accuracy during measuring is set at about 1:15–1:20.

A detailed description will hereunder be given of an embodiment with reference to the accompanying drawings.

Figure 1:
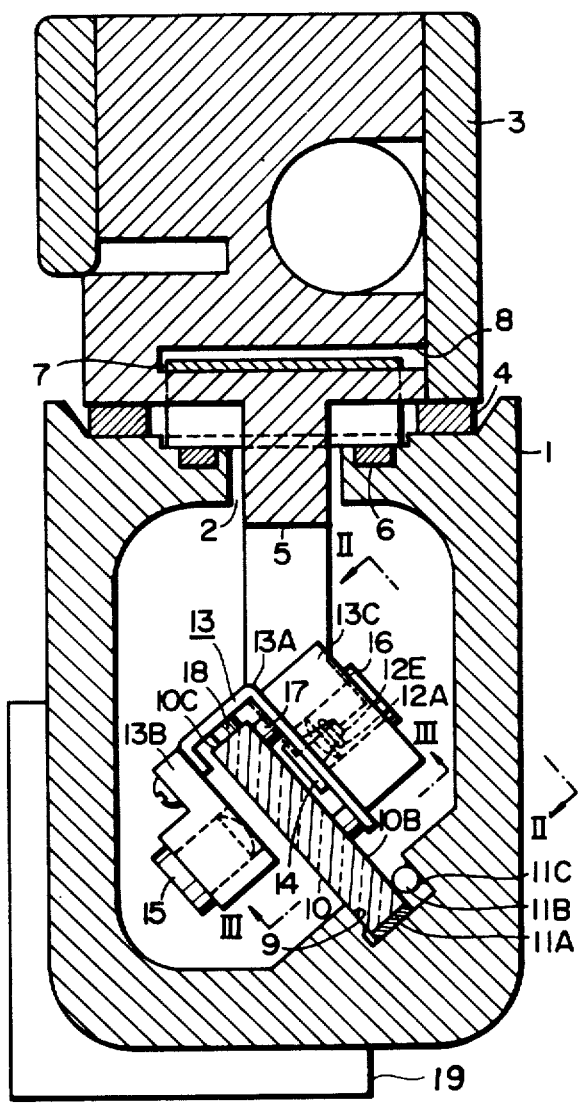
FIG. 1 is a cross sectional view showing one example of the arrangement of the linear scale type displacement measuring instrument of the prior art.
Figure 2:
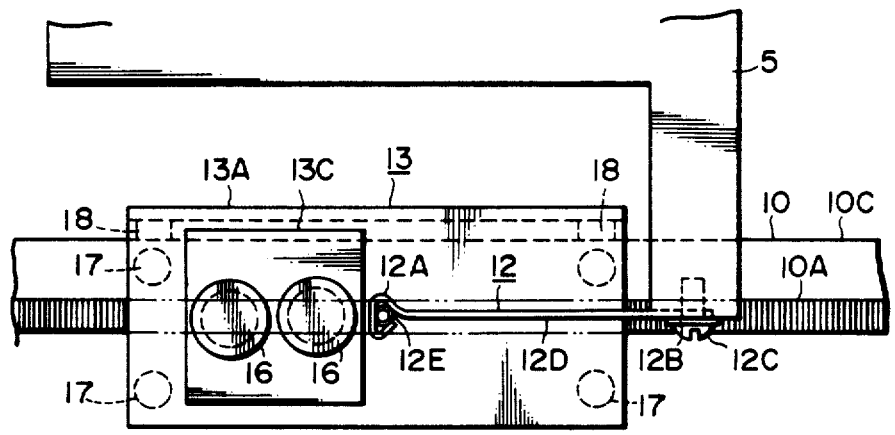
FIG. 2 is a longitudinal sectional view taken along the line II—II in FIG. 1.
Figure 3:
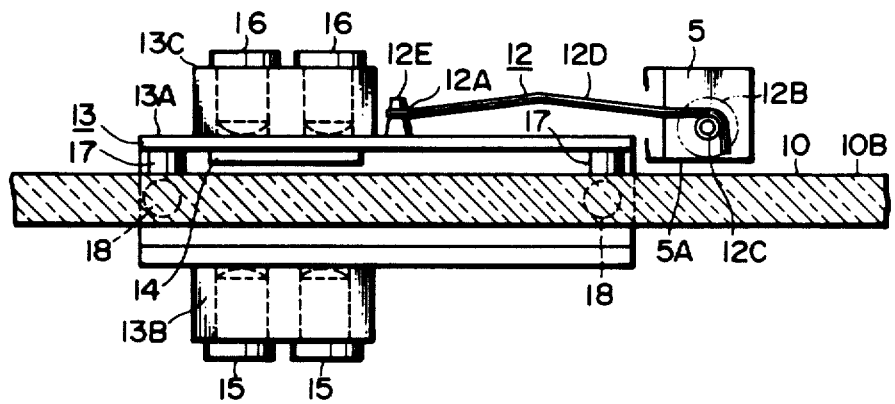
FIG. 3 is a longitudinal sectional view taken along the line III—III in FIG. 1.
Figure 6:
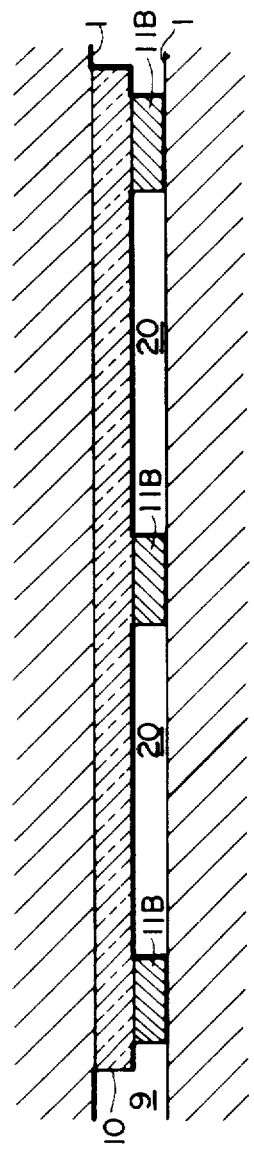
FIG. 6 is a sectional view of the essential portions showing the state of holding the main scale in an embodiment of the linear scale type displacement measuring instrument according to the present invention.

The present embodiment is of such an arrangement that, in the linear scale type displacement measuring instrument having the elongate case 1, the main scale 10, the elastic rubber members 11B and the index scale 14 as shown in the aforesaid FIGS. 1 through 3, elastic member non-joining portions 20 having a pitch and a length, both of which are determined by the material qualities of the main scale 10, the elongate case 1 and the elastic members 11B, and the length of the main scale 10 are provided on the main scale 10 in the longitudinal direction thereof, as shown in FIG. 6.

When the present inventor conducted such experiments that, in the linear scale type displacement measuring instruments provided with the main scales 10 having effective lengths of 250 mm, 500 mm, 750 mm and 1000 mm which are different from one another and having a sectional area of 42 mm² which are identical with one another, the elastic members 11B made of nitrile rubber and having a diameter of 1.8 mm are arranged at regular pitches in such a manner that the length of the joining portions is 10 mm and the length of the non-joining portions is 150 mm, the results shown in the following Table 2 were obtained and it was ascertained that the respective main scales 10 were satisfactorily safe.

The following Table 3 shows the results of experiments in the case where the elastic members 11B made of nitile rubber having a diameter of 2.8 mm are arranged at regular pitches in such a manner that the length of the joining portions is 10 mm and the length of the non-joining portions is 200 mm when the sectional area of the main scale is 110 mm². It is apparent that satisfactory results were obtained also in this case.

In the above embodiment, the elastic rubber member 11B has been made of nitrile rubber; however, the material of the elastic members 11B should not be limited to nitrile rubber, but, other elastic rubber members such as chloroprene rubber or ordinary elastic members may be used.

It should be apparent to those skilled in the art that the above-descrived embodiments are merely representative, which represent the applications of the principles of the present invention. Numerous and varied other arrangements can be readily devised by those skilled in the art without departing from the spirit and the scope of the invention.

TABLE 2

| Item | Standard value | Designed target value | Effective length (mm) | | | |
|---|---|---|---|---|---|---|
| | | | 250 | 500 | 750 | 1000 |
| Fmax (Kg) | 114 | 57 | 1.6 | 2.8 | 4.1 | 5.7 |
| σgmax (Kg/mm²) | 3 | 1.5 | 0.04 | 0.07 | 0.11 | 0.15 |
| σrmax (Kg/mm²) | 0.8 | 0.4 | 0.17 | 0.18 | 0.19 | 0.20 |
| λa-λg (μm) | — | — | 292.5 | 455 | 617.5 | 780 |
| λg2 (μm) | — | Small as possible | 1.1 | 3.1 | 62 | 11.5 |
| Elongation of elastic (μm) rubber member | — | — | 291.4 | 451.9 | 611.3 | 768.5 |
| Value of hysteresis (μm) | — | Small as possible | 0.3 | 1.0 | 2.3 | 4.1 |
| Largest allowable external (g) force | 10 | 12 | 38 | 38 | 38 | 38 |
| Judgement | — | — | | | | |

TABLE 3

| Item | Standard value | Designed target value | Effective length (mm) | | | | |
|---|---|---|---|---|---|---|---|
| | | | 1500 | 2000 | 3000 | 4000 | 4500 |
| Fmax (Kg) | 330 | 165 | 5.2 | 7.7 | 13.8 | 21.4 | 25.8 |
| σgmax (Kg/mm²) | 3 | 1.5 | 0.05 | 0.07 | 0.12 | 0.19 | 0.23 |
| σrmax (Kg/mm²) | 0.8 | 0.4 | 0.16 | 0.19 | 0.25 | 0.31 | 0.34 |
| λa-λg (mm) | — | — | 1.105 | 1.430 | 2.080 | 2.730 | 3.055 |
| λg2 (μm) | — | Small as possible | 5 | 10 | 27 | 56 | 77 |
| Elongation of elastic (mm) rubber member | — | — | 1.100 | 1.420 | 2.053 | 2.674 | 2.978 |
| Value of hysteresis (μm) | — | Small as possible | 1.9 | 3.3 | 7.4 | 13.1 | 16.6 |
| Largest allowable external (g) force | 10 | 12 | 12 | 12 | 12 | 12 | 12 |
| Judgement | — | — | | | | Δ | Δ |

What is claimed is:

1. A linear scale type displacement measuring instrument comprising:
   a hollow elongate case including a reference surface and connected to one of two workpieces, between which a relative displacemnt is to be measured;
   a main scale guided by said reference surface and made of a material having a coefficient of thermal expansion different from that of said elongate case;
   elastic members arranged in a longitudinal groove of said elongate case for urging said main scale to said reference surface so as to hold said main scale in said longitudinal groove; and
   an index scale connected to the other of said two workpieces to be measured and movable along said main scale;
   wherein said relative displacement between said two workpieces to be measured is measured from a relative movement between said main scale and said index scale, characterized in that there are provided in the longitudinal direction of said main scale, elastic member non-joining portions each having a predetermined pitch and a length according to the material qualities of said main scale, said elongate case and said elastic members, and the length of said main scale, whereby a thermal stress acting on said main scale through the elastic members at the time of a temperature change is reduced.

2. A linear scale type displacement measuring instrument as set forth in claim 1, wherein the ratio in length between the elastic member joining portions of said main scale and the non-joining portions is set at about 1:3 or thereabove.

3. A linear scale type displacement measuring instrument as set forth in claim 1, wherein the ratio in length between the elastic member joining portions of said main scale and the non-joining portions is set at about 1:15–1:20.

4. A linear scale type displacement measuring instrument as set forth in claim 1, wherein elastic member non-joining portions each having a length of about 200 mm are provided at intervals of about 215 mm on said main scale.

5. A linear scale type displacement measuring instrument as set forth in claim 1, wherein elastic member non-joining portions each having a length of about 200 mm are provided at intervals of about 210 mm on said main scale.

6. A linear scale type displacement measuring instrument as set forth in claim 1, wherein said main scale is made of glass and the length thereof is 5 meters or less, said elongate case is made of an alloy of aluminium, said elastic members are made of nitrile rubber and the ratio in length between the elastic member joining portions of said main scale and non-joining portions is set at 1:15–1:20.

* * * * *